(12) United States Patent
Kondo

(10) Patent No.: US 8,386,725 B2
(45) Date of Patent: Feb. 26, 2013

(54) USB HOST CONTROLLER AND CONTROLLING METHOD FOR USB HOST CONTROLLER

(75) Inventor: Kunihiro Kondo, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 458 days.

(21) Appl. No.: 12/656,562

(22) Filed: Feb. 3, 2010

(65) Prior Publication Data

US 2010/0217942 A1 Aug. 26, 2010

(30) Foreign Application Priority Data

Feb. 24, 2009 (JP) .................................. 2009/40550

(51) Int. Cl.
*G06F 13/14* (2006.01)
(52) U.S. Cl. ................. 711/154; 711/165; 711/E12.002
(58) Field of Classification Search .................... 711/22, 711/154
See application file for complete search history.

(56) References Cited

U.S. PATENT DOCUMENTS

2005/0055479 A1 3/2005 Zer et al.
2005/0160223 A1* 7/2005 Chen et al. ................... 711/115

FOREIGN PATENT DOCUMENTS

| JP | 4-297935 A | 10/1992 |
| JP | 2004-46392 A | 2/2004 |
| JP | 2007-310760 A | 11/2007 |

OTHER PUBLICATIONS

Axelson, J.: USB Complete—Everything You Need to Develop Custom USB Peripherals, 3rd Edition, Madison: Lakeview Research LLC, 2005.—ISBN 1-931448-03-5.*
German Office Action dated Dec. 15, 2010, with English translation.
Japanese Notification of Reasons for Refusal dated Jul. 17, 2012, with English-language translation.

* cited by examiner

*Primary Examiner* — Kenneth Lo
(74) *Attorney, Agent, or Firm* — McGinn IP Law Group, PLLC

(57) ABSTRACT

The present invention aims to provide a USB host controller capable of reducing time for a data transfer between storage devices. A USB host controller according to the present invention includes a buffer memory for USB pipe having a first buffer memory region and a second buffer memory region, and a buffer memory controller configured to control a data transfer between the buffer memory for USB pipe and each of first and second devices. The buffer memory controller stores data from the first device in the first buffer memory region, swaps address information corresponding to the first buffer memory region and address information corresponding to the second buffer memory region, and transfers data stored in the first buffer memory region to the second device, on the basis of the address information corresponding to the first buffer memory region after the swapping.

14 Claims, 8 Drawing Sheets

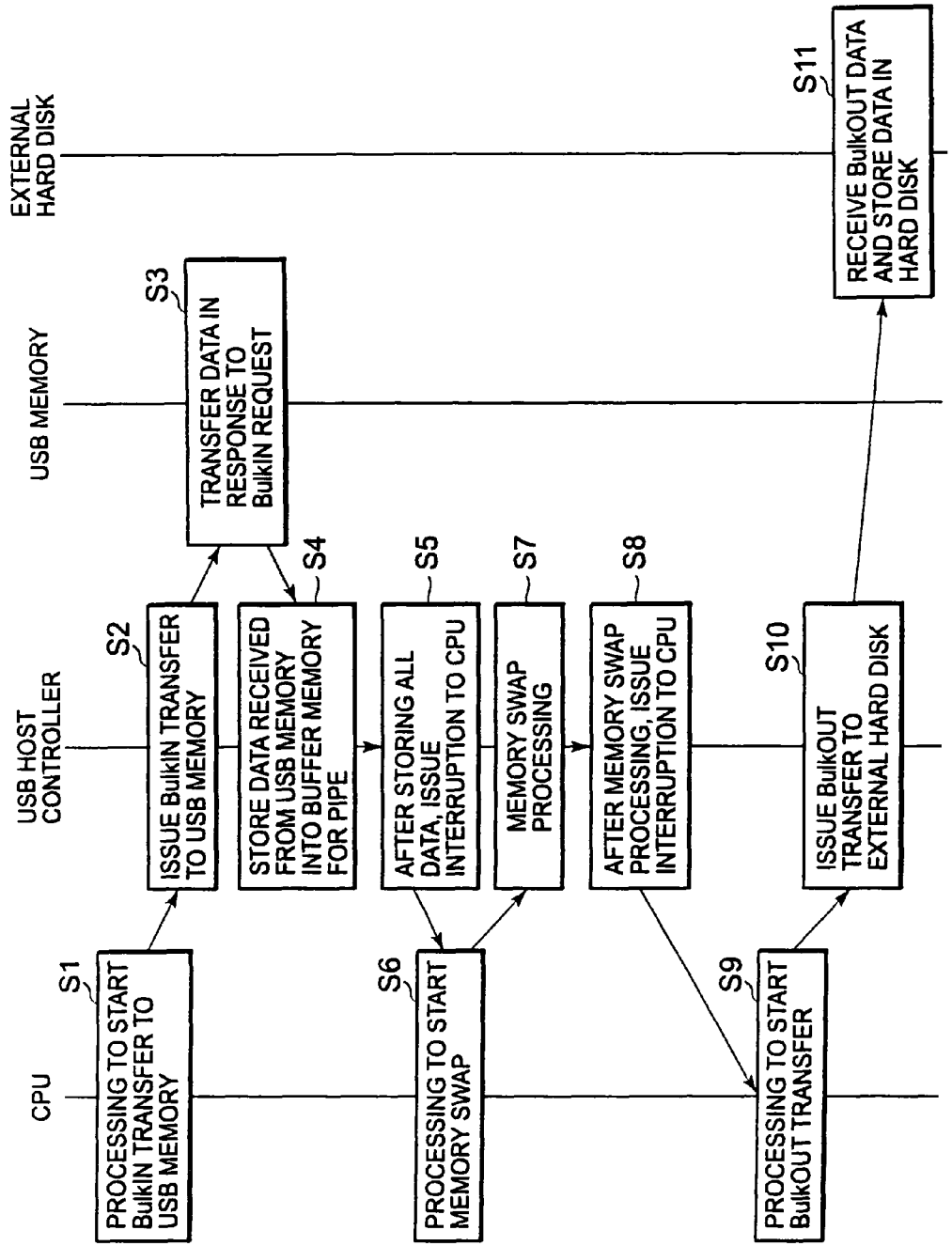

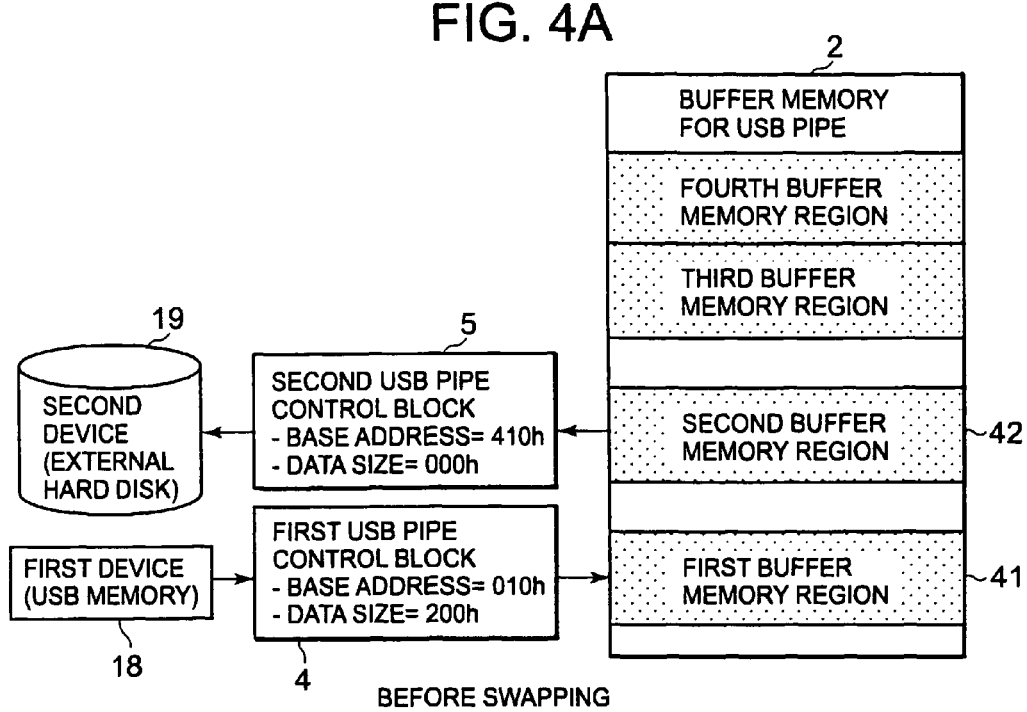
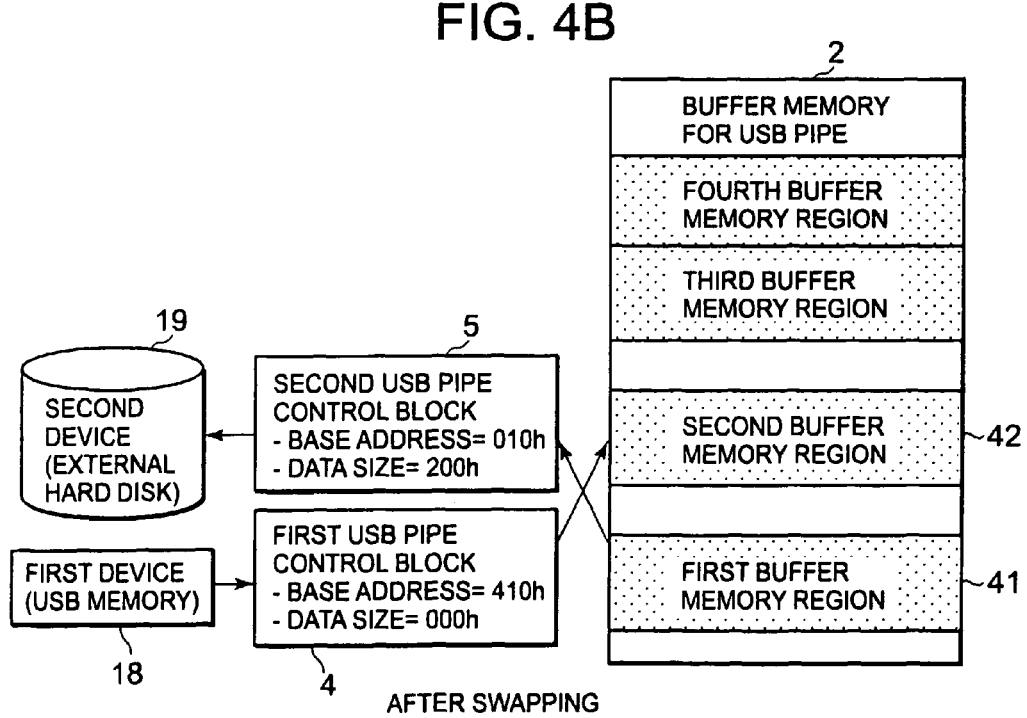

USB HOST CONTROLLER AND CONTROLLING METHOD FOR USB HOST CONTROLLER

FIELD OF THE INVENTION

The present invention relates to a USB host controller and a controlling method for a USB host controller.

DESCRIPTION OF THE RELATED ART

In recent years, a Universal Serial Bus (USB) interface has been used as an interface for connecting a computer with its peripheral devices. The USB interface is also used in embedded systems. FIG. 5 is a diagram showing a configuration example of a data input/output device and USB peripheral devices connected to the device. FIG. 5 selectively shows only storage units as data input devices and input/output controllers for these storage devices. The storage units are used when moving or still image data is stored from a device such as a digital camera, for example.

A data input/output device 122 shown in FIG. 5 includes a CPU 120, a memory 121, a USB host controller 111, a first and a second connectors 116, 117, a serial ATA (SATA) controller 114, a hard disk 115, and a bus 113. The CPU 120, the memory 121, and the USB host controller 111 are connected to one another via the bus 113. In addition, the hard disk 115 is connected to the bus 113 via the SATA controller 114. Moreover, the USB memory 118 is connected to the USB host controller 111 via the first connector 116, and an external hard disk 119 is connected to the USB host controller 111 via the second connector 117.

Meanwhile, a USB host controller has generally been built in a device for the use of a USB as data communication means. FIG. 6 is a diagram showing the USB host controller 111 shown in FIG. 5. The USB host controller 111 shown in FIG. 6 includes a CPU interface control block 108, a buffer memory for USB pipe 102, a first USB pipe control block 104, a second USB pipe control block 105, an n-th USB pipe control block 106, a USB interface control block 107, ports 109, 110, and a bus 112. The CPU interface control block 108, the buffer memory for USB pipe 102, the first USB pipe control block 104, the second USB pipe control block 105, and the n-th USB pipe control block 106 are connected to one another via the bus 112.

A process sequence for moving data from the USB memory 118 to the external hard disk 119 shown in FIG. 5 will be described hereinafter with reference to FIG. 7. Additionally, the data flow at this time will be described with reference to FIG. 8. In addition, in this example, the first USB pipe control block 104 is used to read data (BulkIN) from the USB memory 118, and the second USB pipe control block 105 is used to write data (BulkOUT) into the external hard disk 119.

First, in order to read from the USB memory 118 data to be copied to the external hard disk 119 in FIG. 5, the CPU 120 performs processing to cause the USB host controller 111 to issue a BulkIN transfer request (S101). Then, the USB host controller 111 requests data by issuing the BulkIN transfer request to the USB memory 118 (S102).

In response to the BulkIN request, the USB memory 118 transmits data to the USB host controller 111 (S103). The USB host controller 111 stores the data received from the USB memory in a first buffer memory region 141 in FIG. 8 of the buffer memory for USB pipe 102 (S104).

Then, after storing all the data from the USB memory in the buffer memory for USB pipe 102, the USB host controller 111 notifies the CPU 120 of an interrupt request (S105). Upon detection of the interrupt request, the CPU 120 transfers the data stored in the first buffer memory region 141 of the buffer memory for USB pipe 102 to the memory 121 of the data input/output device 122 of FIG. 5 and stores the data therein (S106).

Next, in order to transfer the data to the external hard disk 119, the data stored in the memory 121 is transferred to the USB host controller 111 (S107). The USB host controller 111 stores the received data in a second buffer memory region 142 in FIG. 8 of the internal buffer memory for USB pipe 102 (S108). Upon completion of transferring all the data (for 1 packet), the CPU 120 performs processing to start a BulkOUT transfer to the external hard disk 119 (S109).

The USB host controller 111 issues the BulkOUT transfer request to the external hard disk 119, and transfers the data stored in the second buffer memory region to the external hard disk 119 (S110). The external hard disk 119 stores therein the data received in the BulkOUT transfer (S111).

FIG. 8 is a diagram for illustrating data flow when data is moved from the USB memory 118 to the external hard disk 119. As shown in FIG. 8, data is stored from the USB memory 118 into the first buffer memory region 141 of the buffer memory for USB pipe 102 via the first USB pipe control block 104 (S101 to S104). Subsequently, the data is transferred from the first buffer memory region 141 of the buffer memory for USB pipe 102 to the memory 121 (S106).

Then, in order to transfer the data to the external hard disk drive 119, the data stored in the memory 121 is stored in the second buffer memory region 142 of the buffer memory for USB pipe 102 (S108). Then, the data is transferred from the second buffer memory region 142 of the buffer memory for USB pipe 102 via the second USB pipe control block 105 to the external hard disk 119 and stored therein (S109 to S111).

In addition, Japanese Patent Application Publication No. 2004-46392 discloses a technique related to a USB host control circuit that can improve transfer efficiency while keeping a load on a CPU low. The USB host control circuit according to Japanese Patent Application Publication No. 2004-46392 includes a pipe control buffer, a pipe information buffer, a transfer information buffer, a pipe selection circuit, and a protocol engine. Here, the pipe selection circuit selects a pipe for performing a data transfer between the CPU and a USB device, according to information stored in the pipe control buffer and the pipe information buffer. Furthermore, the pipe selection circuit acquires a response result to a data transfer from the protocol engine, and switches the pipes for performing the data transfer, while rewriting the information stored in the transfer information buffer depending on the response result.

However, when data is transferred from the USB memory 118 to the external hard disk 119 by using the USB host controller 111 shown in FIG. 5, the data needs to be temporarily stored in the memory 121.

With reference to FIG. 8, in the above example, the first USB pipe control block 104 is used to read data (BulkIN) from the USB memory 118, and the second USB pipe control block 105 is used to write data (BulkOUT) into the external hard disk 119. Thus, when data is transferred by using the USB host controller 111 shown in FIG. 5, the data stored in the first buffer memory region 141 of the buffer memory for USB pipe 102 needs to be transferred to the second buffer memory region 142 thereof. Therefore, to transfer data by using the USB host controller 111 shown in FIG. 5, the data stored in the first buffer memory region 141 is transferred to the second buffer memory region 142 via the memory 121.

In this way, a data transfer takes time if data is transferred from the first buffer memory region 141 to the second buffer memory region 142 via the memory 121 which is located outside the USB host controller 111. In addition, since the bus is occupied during the data transfer between the USB host controller 111 and the external memory 121, throughputs of other processes are decreased.

SUMMARY

A USB host controller according to the present invention includes a buffer memory having a first buffer memory region and a second buffer memory region, and a buffer memory controller configured to control a data transfer between a first device and the buffer memory and a data transfer between a second device and the buffer memory. The buffer memory controller holds address information corresponding to the first buffer memory region and address information corresponding to the second buffer memory region, stores data from the first device into the first buffer memory region, swaps the address information corresponding to the first buffer memory region and the address information corresponding to the second buffer memory region, and transfers the data stored in the first buffer memory to the second device, on the basis of the address information corresponding to the first buffer memory region a after the swapping.

In the USB host controller according to the present invention, the buffer memory controller swaps the address information corresponding to the first buffer memory region for the address information corresponding to the second buffer memory region. This eliminates the need to perform a data transfer using a memory located outside of the USB host controller, thus enabling the decrease in time for a data transfer between storage devices.

A controlling method for a USB host controller according to the present invention is for the controller including a buffer memory having a first buffer memory region and a second buffer memory region, and a buffer memory controller configured to control a data transfer between a first device and the buffer memory, and a data transfer between a second device and the buffer memory. The method includes the steps of: storing data from the first device into the first buffer memory region; swapping address information corresponding to the first buffer memory region and address information corresponding to the second buffer memory region which are held by the buffer memory controller; and transferring the data stored in the first buffer memory region to the second device, on the basis of the address information corresponding to the first buffer memory region after the swapping.

The controlling method for a USB host controller according to the present invention swaps the address information corresponding to the first buffer memory region for the address information corresponding to the second buffer memory region. This eliminates the need to transfer data via a memory located outside of the USB host controller, thus enabling the decrease in time for a data transfer between storage devices.

The present invention can provide a USB host controller capable of reducing time for a data transfer between storage devices and a controlling method for a USB host controller.

BRIEF DESCRIPTION OF DRAWINGS

FIG. 3 is a diagram for illustrating a sequence when data is transferred by using the USB host controller according to the embodiment.

FIGS. 4A and 4B are diagrams each illustrating a case where data is transferred by using the USB host controller according to the embodiment. FIG. 4A shows a state before swapping, and FIG. 4B shows a state after swapping.

DESCRIPTION OF THE PREFERRED EMBODIMENTS

Embodiments of the present invention will be described hereinafter with reference to the drawings.

Figure 1:
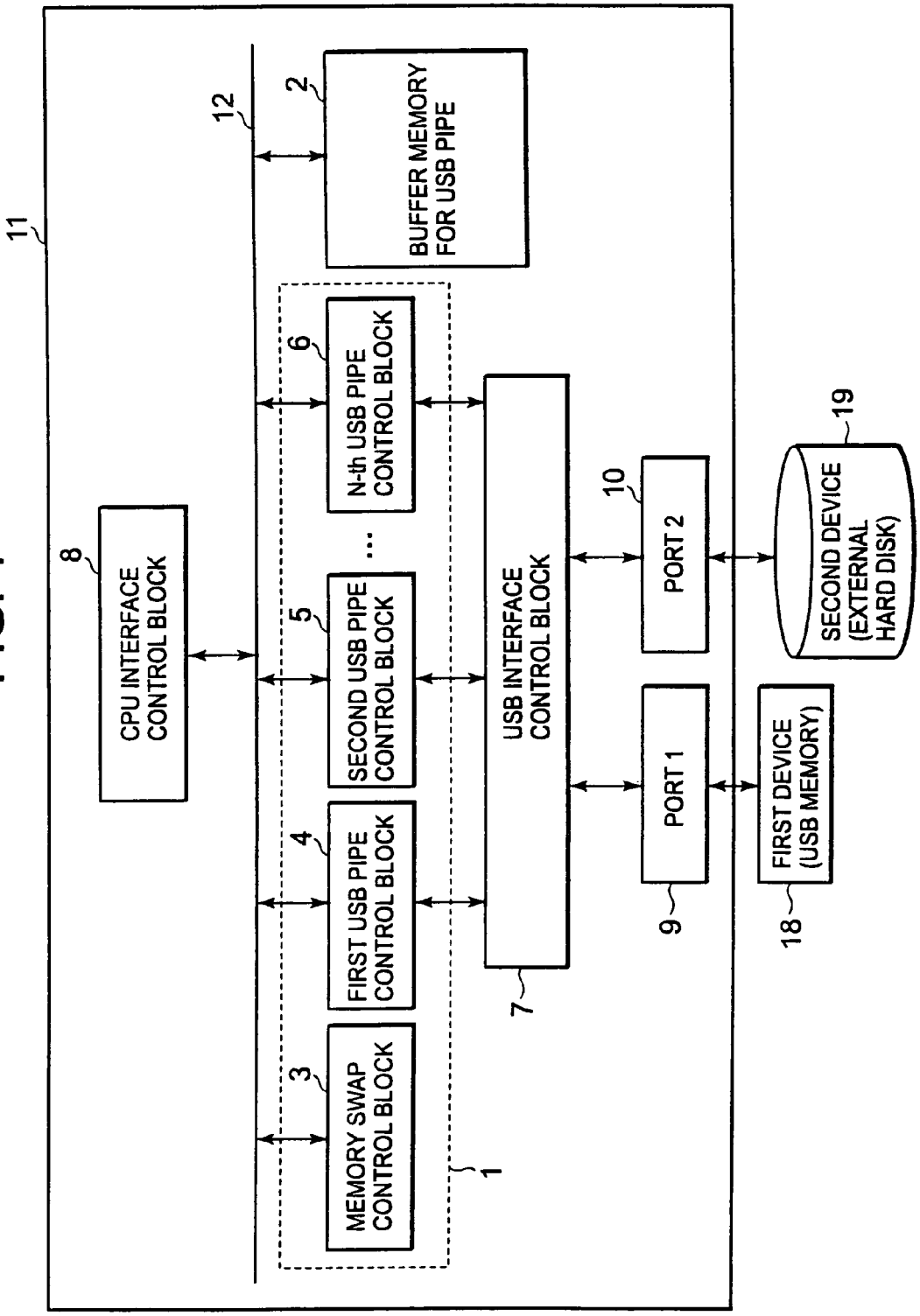
FIG. 1 is a diagram showing a USB host controller according to an embodiment.

FIG. 1 shows a USB host controller according to the embodiment. The USB host controller 11 according to the embodiment includes: a buffer memory for USB pipe (buffer memory) 2 having a first buffer memory region 41 (see FIG. 4) and a second buffer memory region 42 (see FIG. 4); and a buffer memory controller 1 configured to control a data transfer between a first device 18 and the buffer memory for USB pipe 2 and a data transfer between a second device 19 and the buffer memory for USB pipe 2.

The buffer memory controller 1 holds address information corresponding to the first buffer memory region 41 and address information corresponding to the second buffer memory region 42. In addition, the buffer memory controller 1 stores data from the first device 18 into the first buffer memory 41, then swaps the address information corresponding to the first buffer memory region 41 for the address information corresponding to the second buffer memory region 42, and transfers data stored in the first buffer memory region 41 to the second device 19, on the basis of the address information obtained after the swapping, the address information corresponding to the first buffer memory region 41.

The buffer memory controller 1 of the USB host controller 11 shown in FIG. 1 includes a memory swap control block 3 and multiple USB pipe control blocks 4, 5, 6. Furthermore, the USB host controller 11 includes the buffer memory for USB pipe 2 and a CPU interface control block 8. Then, the memory swap control block 3, the multiple USB pipe control blocks 4, 5, 6, the buffer memory for USB pipe 2, and the CPU interface control block 8 are connected to one another via a bus 12. The CPU interface control block 8 has a function to control an instruction from the CPU and an interrupt signal to the CPU.

In addition, the USB pipe control blocks 4, 5, 6 are connected to the USB interface control block 7. Also, the first device 18 and the second device 19 are connected to the USB interface control block 7 via a first port 9 and a second port 10, respectively. In this respect, each of the first device 18 and the second device 19 may be any device as far as the device has a function of storing information. In the embodiment, a description will be given of a case, for example, where the first device 18 is a USB memory and the second device 19 is an external hard disk.

Next, how the buffer memory controller 1 and the buffer memory for USB pipe 2 operate will be described hereinafter.

The buffer memory controller 1 not only transfers data from the USB memory 18 to the buffer memory for USB pipe 2, but also transfers data stored in the buffer memory for USB pipe 2 to the external hard disk 19.

As shown in FIG. 4A, the buffer memory for USB pipe 2 includes multiple buffer memory regions. Here, USB pipe control blocks 4, 5, 6 are allocated to correspond to the respective buffer memory regions.

For example, in FIG. 4A, the first USB pipe control block 4 is allocated to the first buffer memory region 41. Here, the first USB pipe control block 4 has a function of transferring data from the USB memory 18 to the first buffer memory region 41. At this time, the first USB pipe control block 4 transfers data to the first buffer memory region 41, on the basis of base address information written by the memory swap control block 3 and data size. In this respect, the base address information is, for example, a starting point address at the first buffer memory region 41. The first buffer memory region 41 can be specified by using the starting point address and the data size information.

Similarly, the second USB pipe control block 5 is allocated to the second buffer memory region 42. Here, the second USB pipe control block 5 has a function of transferring data stored in the second buffer memory region 42 to the external hard disk 19. At this time, the second USB pipe control block 5 transfers data stored in the second buffer memory region 42 to the external hard disk 19, on the basis of base address information written by the memory swap control block 3 and data size.

In FIG. 4A, data from the USB memory 18 is transferred to the first buffer memory region 41 via the first USB pipe control block 4. However, in order to transfer the data to the external hard disk 19, the data needs to go through the second USB pipe control block 5. Thus, in order to transfer data stored in the first buffer memory region 41 to the external hard disk 19, the data stored in the first buffer memory region 41 needs to be moved to the second buffer memory region 42. To address this, an external memory is provided in the prior art, to move the data stored in the first buffer memory region 41 to the second buffer memory region 42. However, the data movement with the use of the external memory takes time, since the use of the external memory requires a data transfer from the first buffer memory region 41 to the external memory and a data transfer from the external memory to the second buffer memory region 42. In addition, this causes a problem that throughput for other processing is decreased since the bus is occupied during a data transfer between the USB host controller 11 and the external memory. In addition, there arises a need to separately provide a memory outside of the USB host controller 11.

In the embodiment, the problem described above is solved by using the memory swap control block 3 to rewrite address information (base address information and data size information) held by the first USB pipe control block 4 and the second USB pipe control block 5. The case where the memory swap control block 3 rewrites address information of the USB pipe control block will be described hereinafter.

Figure 2:
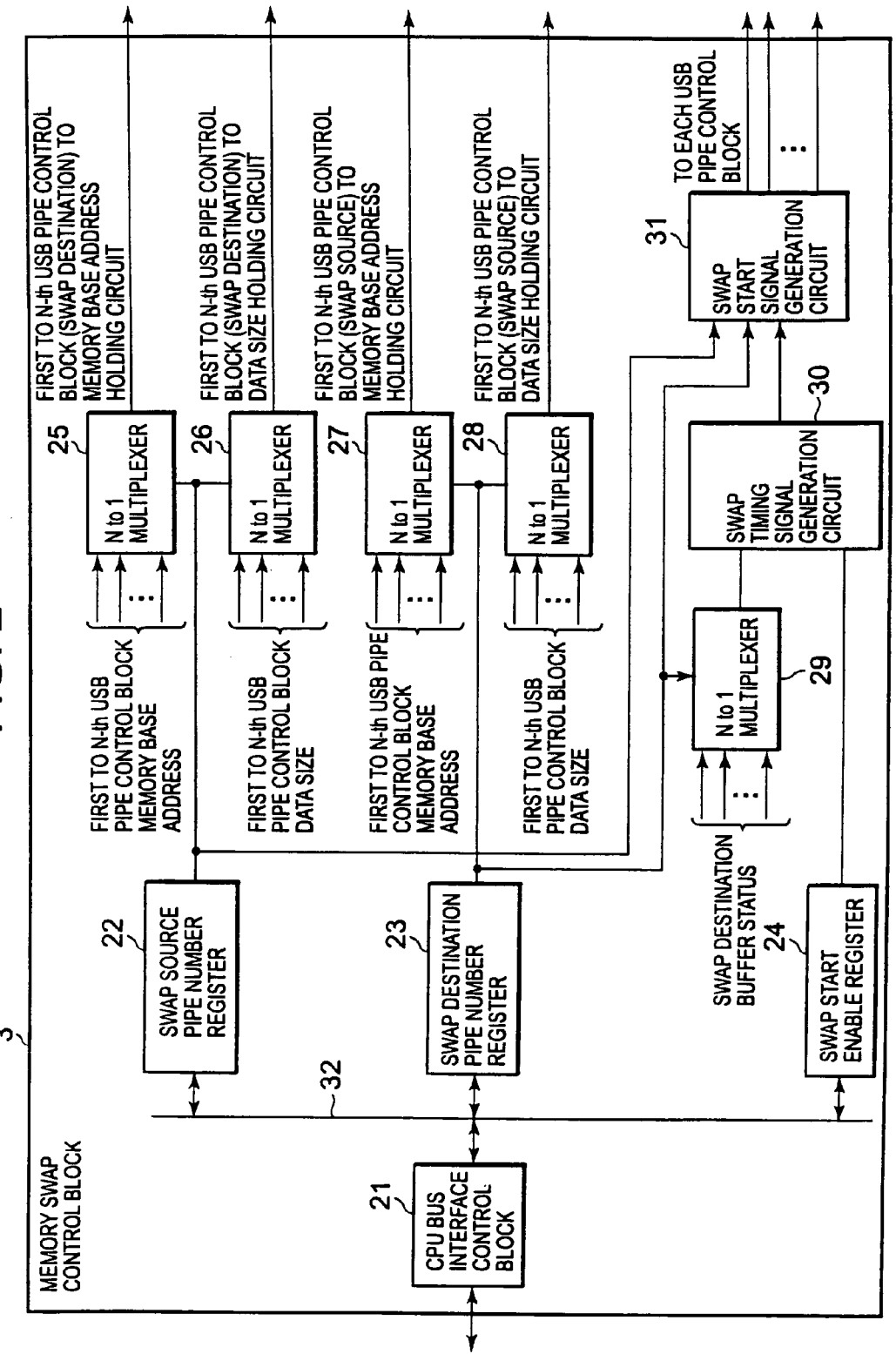
FIG. 2 is a diagram showing a memory swap control block of the USB host controller according to the embodiment.

FIG. 2 is a diagram showing the memory swap control block 3. The memory swap control block 3 includes a CPU bus interface control block 21, a swap source pipe number register 22, a swap destination pipe number register 23, and a swap start enable register 24, which are connected to one another via a bus 32. The CPU bus interface control block 21 has a function of controlling an instruction from the CPU.

The swap source pipe number register 22 stores pipe numbers of swap source USB pipe control blocks. A multiplexer 25 acquires a swap source pipe number from the swap source pipe number register 22, selects base address information of the USB pipe control block according to the pipe number, and transmits the base address information to a memory base address holding circuit of a swap destination USB pipe control block.

Similarly, a multiplexer 26 acquires a swap source pipe number from the swap source pipe number register 22, selects data size information of a USB pipe control block according to the pipe number, and transmits the data size information to a data size holding circuit of a swap destination USB pipe control block.

In addition, the swap destination pipe number register 23 stores pipe numbers of swap destination USB pipe control blocks. A multiplexer 27 acquires a swap destination pipe number from the swap destination pipe number register 23, selects the base address information of a USB pipe control block according to the pipe number, and transmits the base address information to a memory base address holding circuit of a swap source USB pipe control block.

Similarly, a multiplexer 28 acquires a swap destination pipe number from the swap destination pipe number register 23, selects data size information of a USB pipe control block according to the pipe number, and transmits the data size information to a data size holding circuit of a swap source USB pipe control block.

Pipe numbers are written into the swap source pipe number register 22 and the swap destination pipe number register 23 on the basis of instructions from the CPU.

When pipe numbers are written into the swap source pipe number register 22 and the swap destination pipe number register 23, the swap start enable register 24 is set, and a signal indicating that the swap start enable register 24 has been set is transmitted to a swap timing signal generation circuit 30. A multiplexer 29 selects swap destination buffer status information on the basis of a pipe number stored in the swap destination pipe number register 23, and transmits the information to the swap timing signal generation circuit 30. In this respect, the swap destination buffer status information is information indicating whether or not a swap destination buffer memory region is empty. If the swap destination buffer memory region is not empty, the swap timing signal generation circuit 30 suspends starting of swap operation, and waits till the swap destination buffer memory region becomes empty. If the swap destination buffer memory region is empty, the swap timing signal generation circuit 30 transmits a swap timing signal to a swap start signal generation circuit 31.

The swap start signal generation circuit 31 acquires a swap source pipe number from the swap source pipe number register 22 and a swap destination pipe number from the swap destination pipe number register 23. Upon receipt of a swap timing signal from the swap timing signal generation circuit 30, the swap start signal generation circuit 31 transmits a swap start signal to each of a swap source USB pipe control block and a swap destination USB pipe control block. Upon receipt of the swap start signals, the swap source USB pipe control block and the swap destination USB pipe control block rewrite base address information and data size information selected by the respective multiplexers 25, 26, 27, 28 over base address information and data size information which they currently hold.

Figure 5:
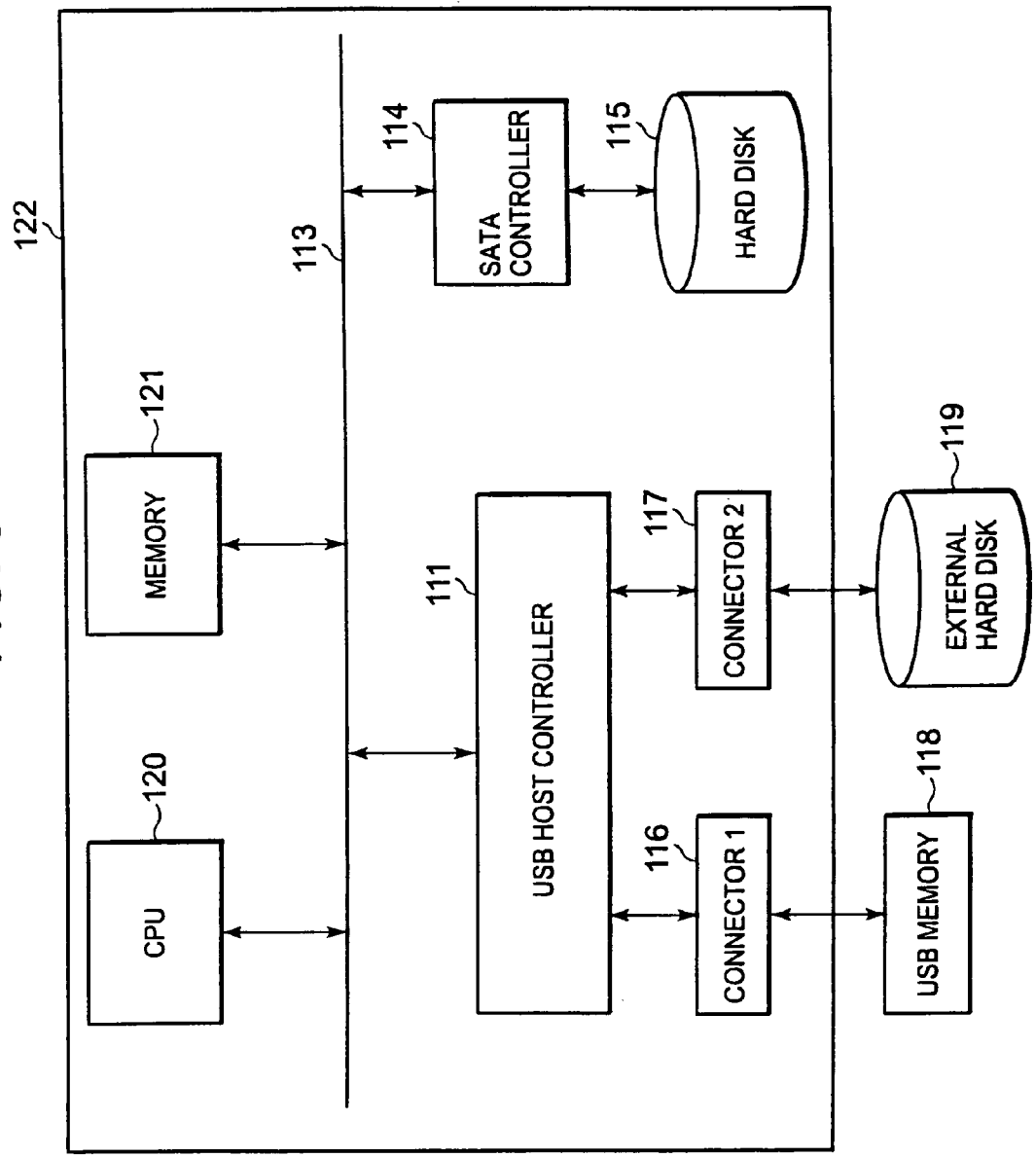
FIG. 5 is a diagram showing a data input/output device according to the prior art.
Figure 6:
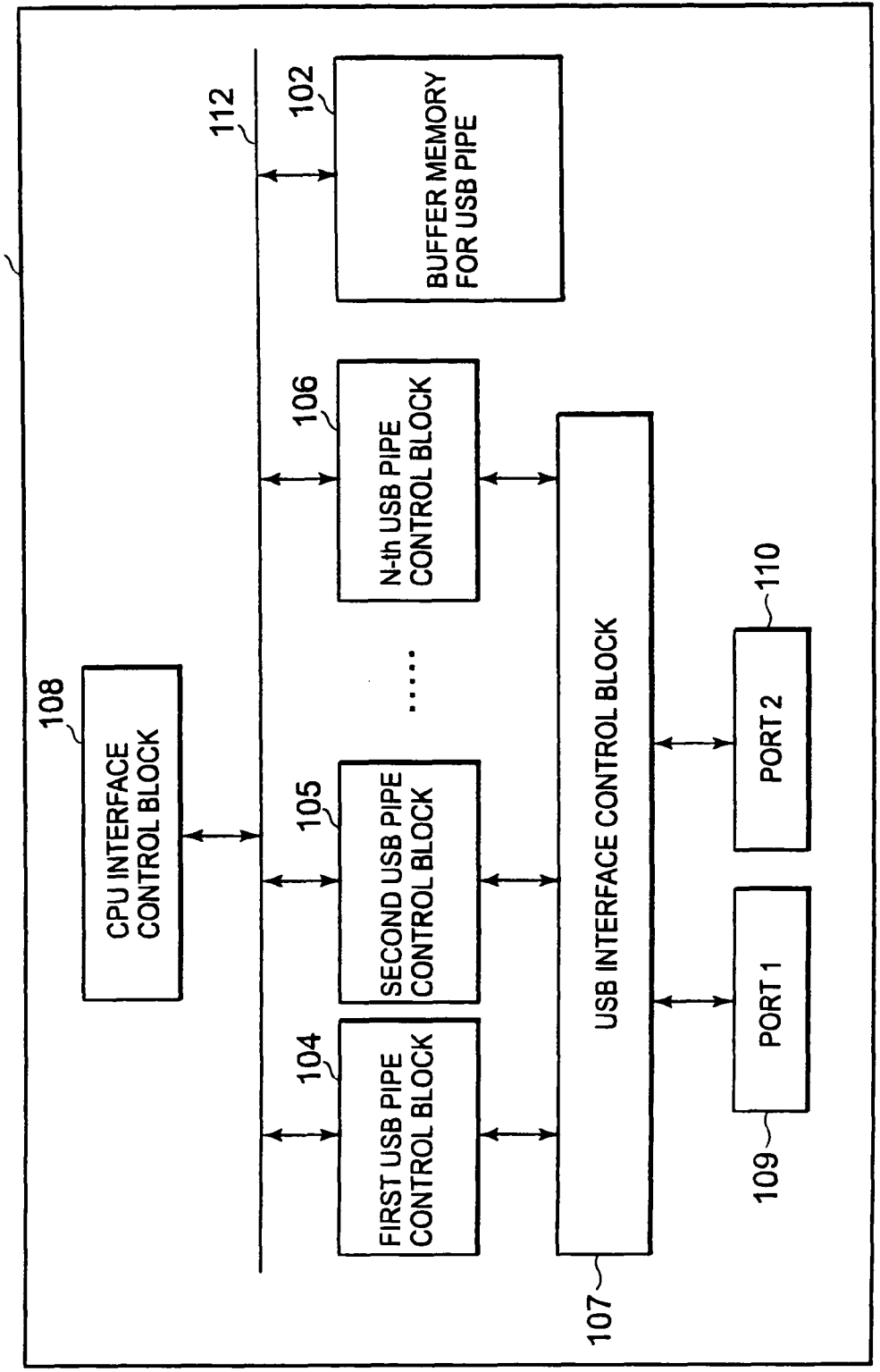
FIG. 6 is a diagram showing a USB host controller according to the prior art.
Figure 7:
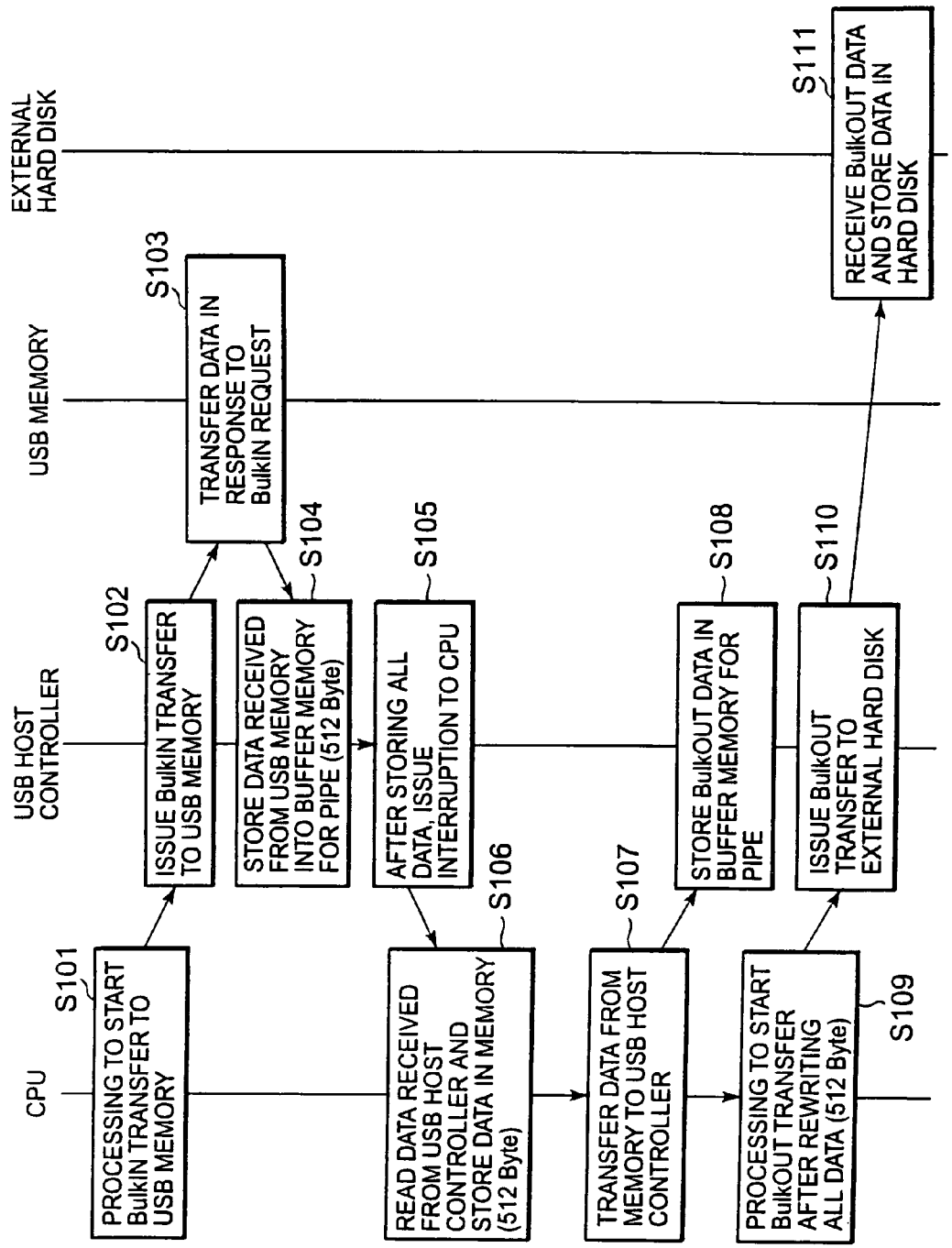
FIG. 7 is a diagram for illustrating a sequence of a case where data is transferred by using the USB host controller according to the prior art.
Figure 8:
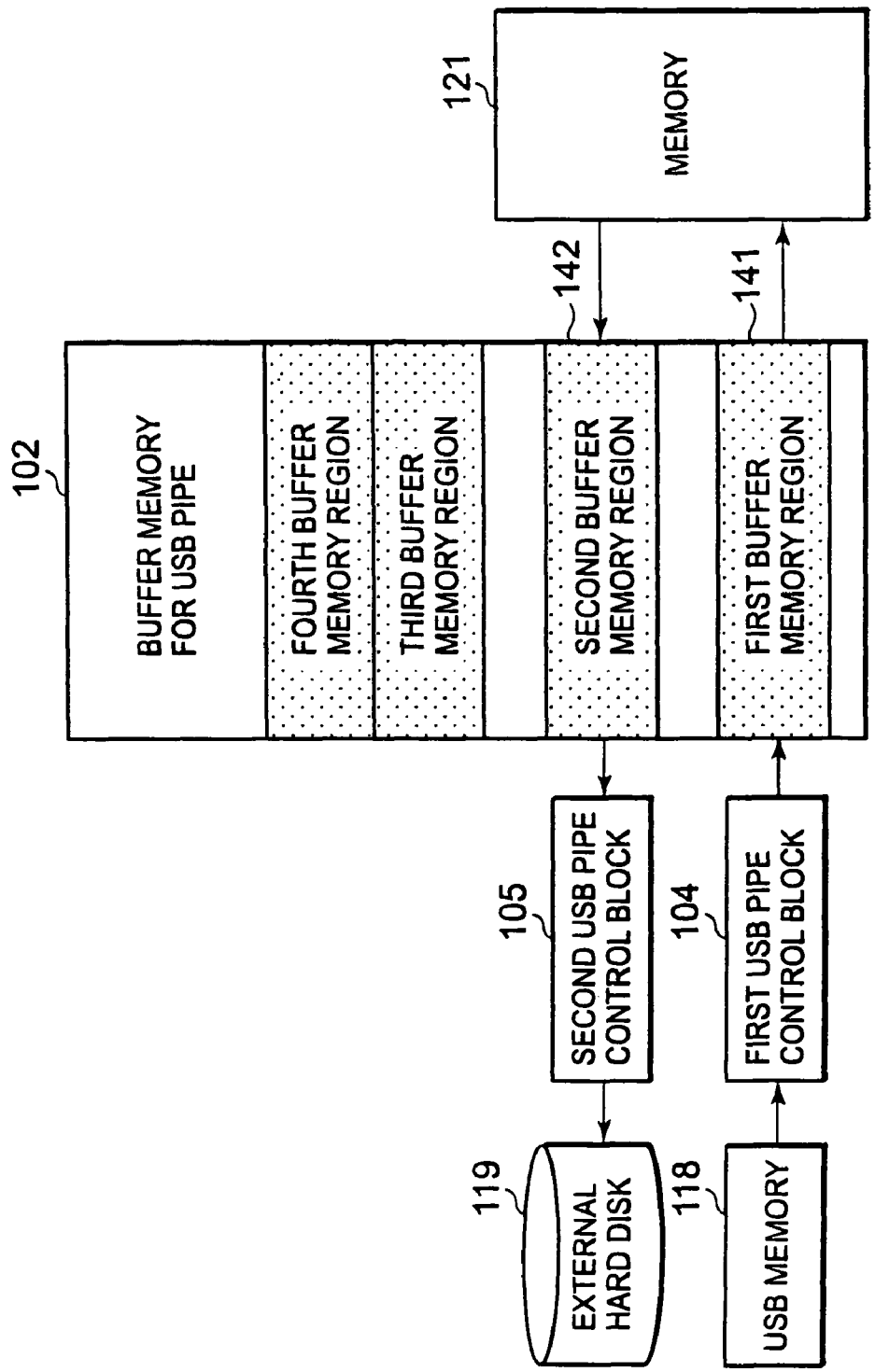
FIG. 8 is a diagram for illustrating a case where data is transferred by using the USB host controller according to the prior art.

The case where data is transferred from the USB memory 18 to the external hard disk 19 by using the USB host controller 11 according to the embodiment will be described hereinafter with reference to FIG. 3. Here, it is assumed that the first USB pipe control block 4 is used to read data (BulkIN) from the USB memory 18, and the second USB pipe control block 5 is used to write data (BulkOUT) to the external hard disk 19. In addition, it is assumed that the USB host controller 11 is built in the data input/output device 122 as shown in FIG. 5, for example. Moreover, FIG. 4A shows the states of the first USB pipe control block 4 and the second USB pipe control block 5 before swapping, and FIG. 4B shows the states of the first USB pipe control block 4 and the second USB pipe control block 5 after swapping. In the following, a description will be given using FIG. 1, FIG. 2 and FIG. 4, as appropriate.

First, in order to read from the USB memory 18 data to be copied to the external hard disk 19 of FIG. 1, the CPU performs processing to cause the USB host controller 11 to issue a BulkIn transfer request (S1). Then, the USB host controller 11 requests data by issuing the BulkIn transfer request to the USB memory 18 (S2).

In response to the BulkIn request, the USB memory 18 transmits the data to the USB host controller 11 (S3). The USB host controller 11 stores the data received from the USB memory into the first buffer memory region 41 (see FIG. 4) of the buffer memory for USB pipe 2 (S4).

Then, after storing all the data from the USB memory into the buffer memory for USB pipe 2, the USB host controller 11 notifies the CPU of an interrupt request (S5). In order to swap memory, the CPU, which has detected the interrupt request, sets the pipe number (1$h$ in the example of the embodiment), which has received data from the USB memory, in the swap source pipe number register 22 of the memory swap control block shown in FIG. 2. In addition, the CPU sets the pipe number (2$h$ in the example of the embodiment), which transmits the data to the external hard disk 19, in the swap destination pipe number register 23.

The multiplexer 25 shown in FIG. 2 acquires the swap source pipe number (1$h$) from the swap source pipe number register 22, selects base address information (010$h$) of the first USB pipe control block 4 according to the pipe number, and transmits the base address information to the base address holding circuit of the swap destination second USB pipe control block 5.

Similarly, the multiplexer 26 acquires the swap source pipe number (1$h$) from the swap source pipe number register 22, selects data size information (200$h$) of the first USB pipe control block 4 according to the pipe number, and transmits the data size information to the data size holding circuit of the swap destination second USB pipe control block 5.

The multiplexer 27 acquires the swap destination pipe number (2$h$) from the swap destination pipe number register 23, selects base address information (410$h$) of the second USB pipe control block 5 according to the pipe number, and transmits the base address information to the base address holding circuit of the swap source first USB pipe control block 4.

Similarly, the multiplexer 28 acquires the swap destination pipe number (2$h$) from the swap destination pipe number register 23, selects data size information (000$h$) of the second USB pipe control block 5 according to the pipe number, and transmits the data size information to the data size holding circuit of the first USB pipe control block 4 of the swap source.

When the pipe number is written into the swap source pipe number register 22 and the swap destination pipe number register 23 shown in FIG. 2, the swap start enable register 24 is set, and a signal indicating that the swap start enable register 24 has been set is transmitted to the swap timing signal generation circuit 30. The multiplexer 29 selects swap destination buffer status information on the basis of the pipe number (2$h$) stored in the swap destination pipe number register 23, and transmits the information to the swap timing signal generation circuit 30.

If the second buffer memory region 42, which is the swap destination buffer memory region, is not empty, the swap timing signal generation circuit 30 suspends start of the swap operation, and waits till the second buffer memory region 42 becomes empty. If the second buffer memory region 42 is empty, the swap timing signal generation circuit 30 transmits a swap timing signal to the swap start signal generation circuit 31.

When the swap start signal generation circuit 31 acquires the swap source pipe number (1$h$) and the swap destination pipe number (2$h$) and receives a swap timing signal from the swap timing signal generation circuit 30, the swap start signal generation circuit 31 transmits a swap start signal to each of the swap source first USB pipe control block 4 and the swap destination second USB pipe control block 5 (S6).

Upon receipt of the swap start signals, the swap source first USB pipe control block 4 and the swap destination second USB pipe control block 5 perform memory swap processing of replacing base address information and data size information that they currently hold with base address information and data size information selected by the respective multiplexers 25, 26, 27, 28 (S7).

The operation of S7 will be described with reference to FIG. 4. Before swapping is performed, the base address information of the first USB pipe control block 4 is 010$h$, the data size information of the first USB pipe control block 4 is 200$h$, the base address of the second USB pipe control block 5 is 410$h$, and the data size of the second USB pipe control block 5 is 000$h$. Then, after the swap processing is performed, the base address information of the first USB pipe control block 4 is 410$h$ and the data size information of the first USB pipe control block 4 is 000$h$. In addition, the base address of the second USB pipe control block 5 is 010$h$, and the data size of the second USB pipe control block 5 is 200$h$.

In other words, as a result of the swap processing described above, the second USB pipe control block 5 can read data stored in the first buffer memory region 41 because the base address information and the data size information of the second USB pipe control block 5 come to correspond to the information in the first buffer memory region 41.

It should be noted that, although the base address information and the data size information are used in FIG. 4, as address information of the USB pipe control block, any information may be used as far as the information is capable of identifying the buffer memory region. For example, a start point address and an endpoint address of the buffer memory region may be used as address information.

Then, after the swap processing described above, the USB host controller 11 issues an interrupt request to the CPU to notify the CPU that the swapping is completed (S8). Upon receipt the swap completion notice from the USB host controller 11, the CPU performs processing to start BulkOUT transfer to the external hard disk 19 (S9).

The USB host controller 11 issues the BulkOUT transfer request to the external hard disk 19, and transfers data stored in the first buffer memory region to the external hard disk 19 (S10). The external hard disk 19 stores the data received in the BulkOUT transfer into the hard disk (S11).

In the USB host controller 11 according to the embodiment, the memory swap control block 3 swaps the address information stored in the first USB pipe control block 4 and corresponding to the first buffer memory region 41 and the address information stored in the second USB pipe control block 5 and corresponding to the second buffer memory region 42. This eliminates a need to transfer data by using a memory located outside of the USB host controller 11, thus enabling the decrease in time for a data transfer between storage devices. This also eliminates a need to separately provide a memory outside of the USB host controller 11.

A controlling method for a USB host controller according to the embodiment has the following steps. Here, the USB host controller includes: a buffer memory (buffer memory for USB pipe) having a first buffer memory region and a second buffer memory region; and a buffer memory controller configured to control a data transfer between a first device and the buffer memory and a data transfer between a second device and the buffer memory.

The steps included are:

the step of storing data from the first device into the first buffer memory region;

the step of swapping the address information corresponding to the first buffer memory region with the address information corresponding to the second buffer memory region which are held by the buffer memory controller; and the step of transferring data stored in the first buffer memory region to the second device, on the basis of the address information obtained after the swapping, the address information corresponding to the first buffer memory region.

Also in the controlling method for a USB host controller according to the present invention, the address information corresponding to the first buffer memory region and the address information corresponding to the second buffer memory region are swapped. This eliminates a need to transfer data via a memory located outside of the USB host controller, thus enabling the decrease in time for a data transfer between storage devices.

Therefore, the present invention according to the embodiment can provide a USB host controller capable of reducing time for a data transfer between the storage devices, and a controlling method for a USB host controller.

It is apparent that the present invention is not limited to the above embodiments, but may be modified and changed without departing from the scope and spirit of the invention.

What is claimed is:

1. A USB host controller comprising:
a buffer memory comprising a first buffer memory region and a second buffer memory region; and
a buffer memory controller configured to control a data transfer between a first device and the buffer memory and a data transfer between a second device and the buffer memory, wherein
the buffer memory controller
holds address information corresponding to the first buffer memory region and address information corresponding to the second buffer memory region,
stores data from the first device into the first buffer memory region,
swaps the address information corresponding to the first buffer memory region and the address information corresponding to the second buffer memory region, and
transfers the data stored in the first buffer memory region to the second device, on the basis of the address information corresponding to the first buffer memory region after the swapping.

2. The USB host controller according to claim 1, wherein the buffer memory controller has a plurality of USB pipe control blocks each of which stores the address information and transfers the data based on the address information.

3. The USB host controller according to claim 1, wherein the buffer memory controller includes a first USB pipe control block, a second USB pipe control block, and a memory swap control block for swapping the address information of the first USB pipe control block and the address information of the second USB pipe control block,
the first USB pipe control block holds the address information corresponding to the first buffer memory region, and stores the data from the first device in the first buffer memory region,
the second USB pipe control block holds the address information corresponding to the second buffer memory region,
after the first USB pipe control block stores the data from the first device in the first buffer memory region, the memory swap control block swaps the address information corresponding to the first buffer memory region that is held by the first USB pipe control block and the address information corresponding to the second buffer memory region that is held by the second USB pipe control block, and thereby causes the second USB pipe control block to hold the address information corresponding to the first buffer memory region, and
the second USB pipe control block transfers the data stored in the first buffer memory region to the second device.

4. The USB host controller according to claim 1, wherein the address information corresponding to each of the first and second buffer memory regions includes address information of the each of the first and the second buffer memory regions and size of data stored in the each of the first and second buffer memory regions.

5. The USB host controller according to claim 1, wherein the address information corresponding to each of the first and second buffer memory regions includes a start point address of the each of the first and second buffer memory regions and size of data stored in the each of the first and second buffer memory regions.

6. The USB host controller according to claim 1, wherein the address information corresponding to each of the first and second buffer memory regions includes a start point address and an end point address of the each of the first and second buffer memory regions.

7. The USB host controller according to claim 1, wherein the buffer memory controller swaps the address information corresponding to the first buffer memory region and the address information corresponding to the second buffer memory region, after the second buffer memory region becomes empty.

8. The USB host controller according to claim 1, wherein the buffer memory controller
stores data from the second device into the second buffer memory region, and
transfers the data stored in the second buffer memory region to the first device, on the basis of the address information corresponding to the second buffer memory region after the swapping.

9. The USB host controller according to claim 1, wherein the buffer memory controller comprises a USB PIPE control block that is configured to hold address information, and
wherein if the USB PIPE control block holds the address information corresponding to the first buffer memory region before the swapping, then the USB PIPE control block holds the address information corresponding to the second buffer memory region after the swapping.

10. The USB host controller according to claim 1, wherein the buffer memory controller comprises a USB PIPE control block that is configured to hold address information, and wherein if the USB PIPE control block holds the address information corresponding to the first buffer memory region before the swapping, then the swapping includes rewriting the address information held by the USB PIPE control block with the address information corresponding to the second buffer memory region.

11. The USB host controller according to claim 1, wherein the buffer memory controller transfers the data stored in the first buffer memory region to the second device without first transferring the data to a memory located outside the USB host controller.

12. The USB host controller according to claim 2, wherein the address information corresponding to each of the first and second buffer memory regions includes a start point address and an end point address of the each of the first and second buffer memory regions.

13. The USB host controller according to claim 3, wherein the address information corresponding to each of the first and second buffer memory regions includes a start point address and an end point address of the each of the first and second buffer memory regions.

14. A controlling method for a USB host controller, the controller including: a buffer memory having a first buffer memory region and a second buffer memory region, and a buffer memory controller configured to control a data transfer between a first device and the buffer memory and a data transfer between a second device and the buffer memory, the method comprising:

storing data from the first device into the first buffer memory region;

swapping address information corresponding to the first buffer memory region and address information corresponding to the second buffer memory region held by the buffer memory controller; and transferring the data stored in the first buffer memory region to the second device, on the basis of the address information corresponding to the first buffer memory region after the swapping.

* * * * *